(12) United States Patent
Obi et al.

(10) Patent No.: US 8,018,561 B2
(45) Date of Patent: Sep. 13, 2011

(54) LIQUID CRYSTAL DISPLAY ELEMENT

(75) Inventors: Masaki Obi, Ageo (JP); Azusa Ikeda, Fukaya (JP); Hideki Ito, Kumagaya (JP); Yasushi Kawata, Ageo (JP); Akio Murayama, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 474 days.

(21) Appl. No.: 12/349,315

(22) Filed: Jan. 6, 2009

(65) Prior Publication Data
US 2009/0251651 A1 Oct. 8, 2009

(30) Foreign Application Priority Data
Apr. 8, 2008 (JP) ................. 2008-100196

(51) Int. Cl.
*G02F 1/1333* (2006.01)
(52) U.S. Cl. ........ 349/138; 349/129; 349/139; 349/158; 349/178
(58) Field of Classification Search .................. 349/129, 349/138, 178, 158, 123, 96, 106, 139
See application file for complete search history.

(56) References Cited

U.S. PATENT DOCUMENTS
7,151,583 B2 * 12/2006 Ahn et al. ..................... 349/129

FOREIGN PATENT DOCUMENTS
JP 2005-292515 10/2005
* cited by examiner

*Primary Examiner* — Thoi Duong
(74) *Attorney, Agent, or Firm* — Finnegan, Henderson, Farabow, Garrett & Dunner, L.L.P.

(57) ABSTRACT

Electrode slit portions are formed in a pixel electrode in a direction of crossing a slit for dividing a liquid crystal layer into a plurality of domains. A titanium oxide film is formed so as to be exposed to the liquid crystal layer side via the electrode slit portions, the titanium oxide film having a relative dielectric constant higher than that of an organic film formed at positions corresponding to the electrode slit portions. By the titanium oxide film, an electric field of each domain is set, angles between the director in the vicinity of the electrode slit portion and transmission axes of polarizing plates are made to approximately 45°, and a decrease in transmittance caused by the falling direction of the director can be suppressed. The transmittance and contrast ratio are secured, and simultaneously an excellent wide viewing angle range can be obtained.

8 Claims, 7 Drawing Sheets

(a)

(b)

|  | Relative dielectric constant | Transmittance (%) | Contrast ratio |
|---|---|---|---|
| Embodiment 1 | 20 | 6.0 | 580 |
| Embodiment 2 | 20 | 4.3 | 450 |
| Comparison 1 | - | 5.0 | 500 |
| Comparison 2 | - | 4.1 | 440 |
| Comparison 3 | 7 | 5.0 | 500 |

FIG. 7

LIQUID CRYSTAL DISPLAY ELEMENT

INCORPORATION BY REFERENCE

The present invention claims priority under 35 U.S.C. §119 to Japanese Patent Application No. 2008-100196 filed on Apr. 8, 2008. The content of the application is incorporated herein by reference in its entirety.

FIELD OF THE INVENTION

The present invention relates to a liquid crystal display element in which a liquid crystal layer is divided into a plurality of domains in which falling directions of liquid crystal molecules are different from each other when voltage is applied between a pixel electrode and a counter electrode.

BACKGROUND OF THE INVENTION

A display using liquid crystal elements has been applied to various devices such as OA equipment, information terminals, watches and television sets due to having the characteristics of lightweight, thinness and low power consumption. Particularly, a liquid crystal display element using a thin film transistor (TFT element) has been used, due to high responsiveness, for data display monitors of portable televisions, computers and the like containing a great amount of information.

Recently, with increases in the amounts of information and moving picture displays, high definition, high-speed and wide viewing angle characteristics have been demanded, and the structure of a TFT array has been made minute in accordance with the high fineness.

For high-speed, for example, an OCB mode, a VAN mode, a HAN mode and a π-sequence mode, modes using nematic liquid crystals, a surface stability type ferroelectric liquid crystal (SSFLC) mode using smectic liquid crystals, an anti-ferroelectric liquid crystal (AFLC) mode and the like, have been considered.

Further, wide viewing angle characteristics have been improved by devising liquid crystal driving methods of an IPS mode, VAN mode and OCB mode.

In particular, the VAN mode has recently gained attention since it can obtain a response speed higher than that of a conventional twist nematic (TN) mode and a rubbing orientation treatment process can be removed by adopting vertical orientation treatment, the process conventionally raising serious concerns over occurrence of troubles such as electrostatic discharge failure. Further, since compensation design of a view angle is relatively easy in the VAN mode, the VAN mode can realize a wide viewing angle as a multi-domain type VAN mode (hereinafter, referred to as MVA mode).

As a means for orientation division in the MVA mode, as disclosed in, for example, Japanese Laid-Open Patent Publication No. 2005-292515, there is known a constitution of rib-shaped constructions (projections), lacking portions (slits) of a pixel electrode, or the like which are formed on one or both substrate(s). In the case where a nematic liquid crystal material indicating negative dielectric anisotropy is used, an electric field is tilted to the inside of the slit, and liquid crystal molecules, that is, directors, are tilted to the outside of the slit, by an electric field discrete effect at the slit of the pixel electrode. On the other hand, the directors are tilted to the outside of the projection by a shape effect of the projection on a counter substrate side. There upon, by combining both substrates with each other so that the tilting directions of the directors correspond to each other, orientation division can be excellently performed. Additionally, by making a slit pattern and a projection pattern have anisotropy in a plurality of different directions, for example, forming the slit on the array substrate side and the projection on the counter substrate side so that they respectively shift from the substrate end sides at an approximately 45° angle and shift from each other at approximately 90° so as to have anisotropy of four different directions together, a liquid crystal layer can also be divided into a plurality of domains.

Thus the MVA mode is excellent as a display having a high contrast ratio and a wide viewing angle, however demands have been made for further improvements in the contrast ratio.

As a method for improving the contrast ratio of the MVA mode, it is preferable that an orientation regulating unit does not have a rib-shaped projection structure but a slit structure, and further preferable the area thereof is reduced to the extent possible, because it is important to lower the luminance in black display for obtaining the high contrast ratio. That is, since the directors align perpendicularly to a substrate surface and a phase difference, birefringence index Δn, is 0 in the MVA mode, the luminance of transmitted light in the black display approximates to 0 and the high contrast ratio is obtained in a liquid crystal display in which polarizing plates are bonded with the array substrate and counter substrate respectively so that transmission axes of the plates become orthogonal to each other. However, since the directors located above each of the rib-shaped projections align perpendicularly to a slope of the projection, obliquely, the birefringence index Δn does not become 0, and light slightly leaks. On the other hand, since there is no projection in the slit structure of the pixel electrode, the high contrast ratio is obtained.

However, the director orientation regulating force of the slits of a pixel electrode is smaller than that of the rib-shaped projections, and the force becomes smaller as the area of the slit becomes smaller. Therefore, for example, in the case where a surface of the display is pressed by fingers in white display, the orientation of the directors is easily disturbed. Accordingly, in the case where the slit structure of the pixel electrode is adopted, the number of slits must be increased.

Additionally, as another problem in the case where the slit structure is adopted for a liquid crystal display element of a linear polarization mode, decrease in transmittance is cited. Birefringence of liquid crystal is used for transmission control of light in the MVA mode. Where I represents the transmitted light intensity, $I_0$ represents the incident light intensity, θ represents an angle between the transmission axis (absorption axis) of the polarizing plate and the director, Δn represents a birefringence index of the liquid crystal, d represents the thickness of the liquid crystal layer, and λ represents the wavelength of light, the transmitted light intensity I is calculated by the following expression (1):

$$I = I_0 \cdot \sin^2 2\theta \sin^2(\Delta n \cdot d \cdot \pi/\lambda) \tag{1}$$

As indicated by the expression (1), when the angle between the director of the liquid crystal and the transmission axis of the polarizing plate is 45° and the falling angle is large, a ratio of the transmitted light intensity I to the incident light intensity $I_0$, transmittance, becomes maximum. In the case of the slit structure, the falling angle is controlled by the electric field discrete effect, and the angle between the director and the transmission axis of the polarizing plate depends on the width of the slit. That is, in the case where the width of the slit is large, the director falls approximately orthogonally to a longitudinal side of the slit, and in the case where the width thereof is small, the director falls approximately parallel with the longitudinal side of the slit. Additionally, in the case where the width of the slit is large, the center of the slit does not sufficiently obtain the electric field discrete effect, the falling angle of the director becomes small, and the transmittance lowers. Accordingly, it is preferable that the width of the slit is small, and particularly 5 μm or less.

However, even if the width of the slit is thus reduced, the angle between the director of the liquid crystal and the transmission axis of the polarizing plate deviates from 45° indicating the maximum transmittance due to the change in the electric field discrete effect, and the transmittance lowers.

In view of the problem, the present invention has been made and aims at providing a liquid crystal display element for securing the transmittance and contrast ratio and obtaining an excellent wide viewing angle range.

SUMMARY OF THE INVENTION

The present invention provides a liquid crystal element including: an array substrate including an array substrate body and a plurality of pixel electrodes formed on a principal surface side of the array substrate body; a counter substrate which includes a counter substrate body and a counter electrode formed on a principal surface side of the counter substrate body, and is arranged so as to face the array substrate; a liquid crystal layer including a liquid crystal material having negative dielectric anisotropy and interposed between the array substrate and the counter substrate; polarizing plates respectively arranged on the array substrate and the counter substrate and having transmission axes approximately orthogonal to each other; a slit formed in the counter electrode and for dividing the liquid crystal layer into a plurality of domains in which falling directions of liquid crystal molecules are different from each other when voltage is applied between the pixel electrode and the counter electrode; lacking portions which are provided in at least either the pixel electrode or counter electrode in a direction crossing the slit and control the falling directions of the liquid crystal molecules in each domain; and a high dielectric constant insulating layer which is exposed to the liquid crystal layer through the lacking portions, is transparent in a visible light region and has a relative dielectric constant higher than that of at least either the array substrate body or counter substrate body. The lacking portions for controlling the falling directions of the liquid crystal molecules are formed in at least either the pixel electrode or the counter electrode, along the direction crossing the slit for dividing the liquid crystal layer into the plurality of domains in which the falling directions of the liquid crystal molecules are different from each other when voltage is applied between the pixel electrode and counter electrode. The high dielectric constant insulating layer having a relative dielectric constant higher than that of at least either the array substrate body or counter substrate body is formed so as to be exposed to the liquid crystal layer via the lacking portions. By the high dielectric constant insulating layer, an electric field of each domain is set, an angle between the liquid crystal molecule in the vicinity of the lacking portion and a transmission axis of the polarizing plate is made to approximate to 45°, decrease in transmittance caused by the falling direction of the liquid crystal molecule can be suppressed, the transmittance and a contrast ratio are secured, and simultaneously an excellent wide viewing angle range can be obtained.

Additionally, the present invention provides a liquid crystal element including: an array substrate including an array substrate body and a plurality of pixel electrodes formed on a principal surface side of the array substrate body; a counter substrate which includes a counter substrate body and a counter electrode formed on a principal surface side of the counter substrate body, and is arranged so as to face the array substrate; a liquid crystal layer including a liquid crystal material having negative dielectric anisotropy and interposed between the array substrate and the counter substrate; polarizing plates respectively arranged on the array substrate and the counter substrate and having transmission axes approximately orthogonal to each other; a slit formed in the counter electrode and for dividing the liquid crystal layer into a plurality of domains in which falling directions of liquid crystal molecules are different from each other when voltage is applied between the pixel electrode and the counter electrode; lacking portions which are provided in at least either the pixel electrode or counter electrode in a direction crossing the slit and control the falling directions of the liquid crystal molecules in each domain; an insulating layer which is formed at positions corresponding to at least the lacking portions and transparent in a visible light region; and a high dielectric constant insulating layer which covers the insulating layer at the positions corresponding at least to the lacking portions, is exposed to the liquid crystal layer via the lacking portions, is transparent in the visible light region and has a relative dielectric constant higher than that of the insulating layer. The lacking portions for controlling the falling directions of the liquid crystal molecules are formed in at least either the pixel electrode or counter electrode, along the direction crossing the slit for dividing the liquid crystal layer into a plurality of domains in which the falling directions of the liquid crystal molecules are different from each other when voltage is applied between the pixel electrode and counter electrode. The high dielectric constant insulating layer having a relative dielectric constant at least higher than that of the insulating layer formed at positions corresponding to the lacking portions is formed so as to be exposed to the liquid crystal layer side via the lacking portions. By the high dielectric constant insulating layer, an electric field of each domain is set, an angle between the liquid crystal molecule in the vicinity of the lacking portion and a transmission axis of the polarizing plate is made to approximate to 45°, decrease in transmittance caused by the falling direction of the liquid crystal molecule can be suppressed, the transmittance and a contrast ratio are secured, and simultaneously an excellent wide viewing angle range can be obtained.

BRIEF DESCRIPTION OF THE DRAWINGS

FIG. 7 is a table indicating transmittances and contrast ratios of the liquid crystal display element of Embodiments 1 and 2, and Comparisons 1 to 3.

DETAILED DESCRIPTION OF THE PREFERRED EMBODIMENT

Figure 1:
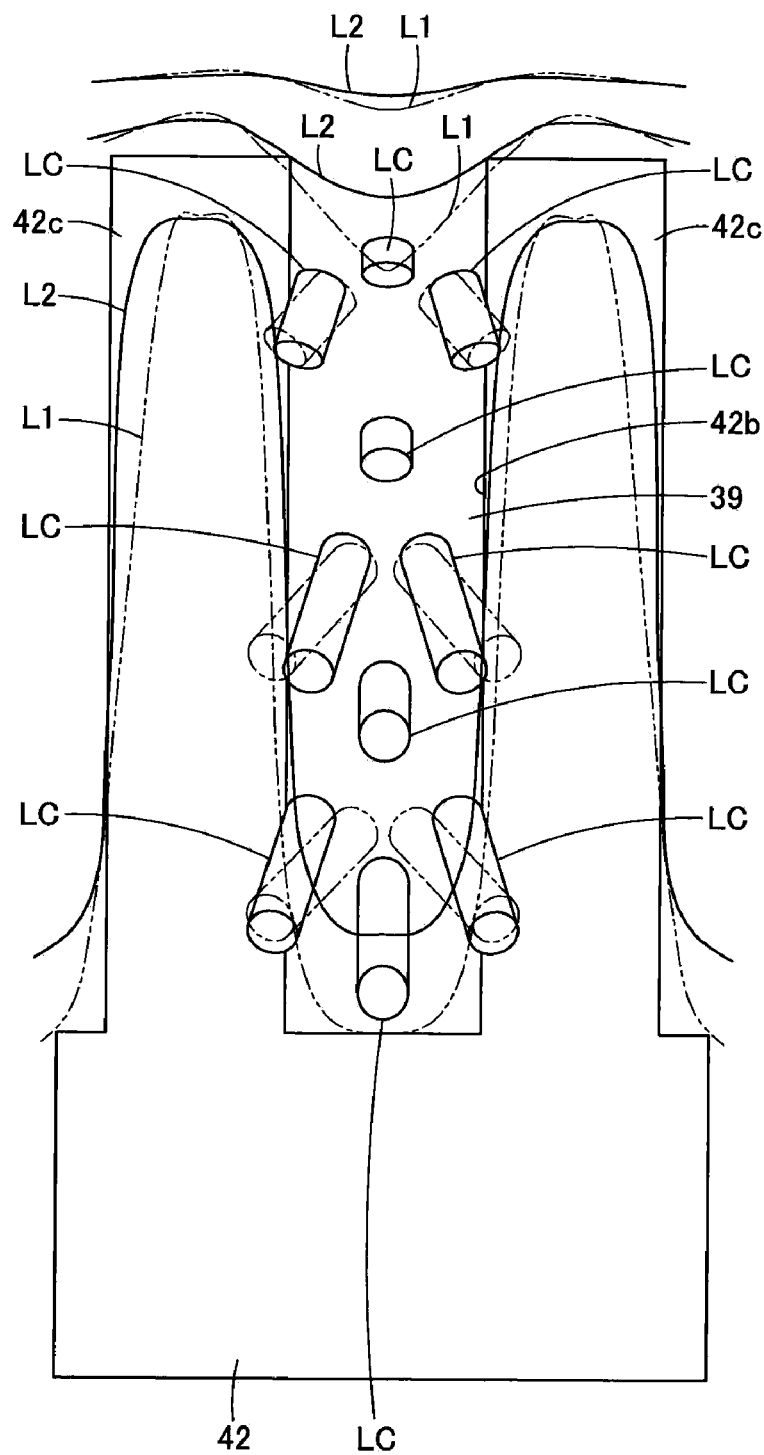
FIG. 1 is an explanatory plan view showing a main portion of a liquid crystal display element of a first embodiment of the present invention.
Figure 2:
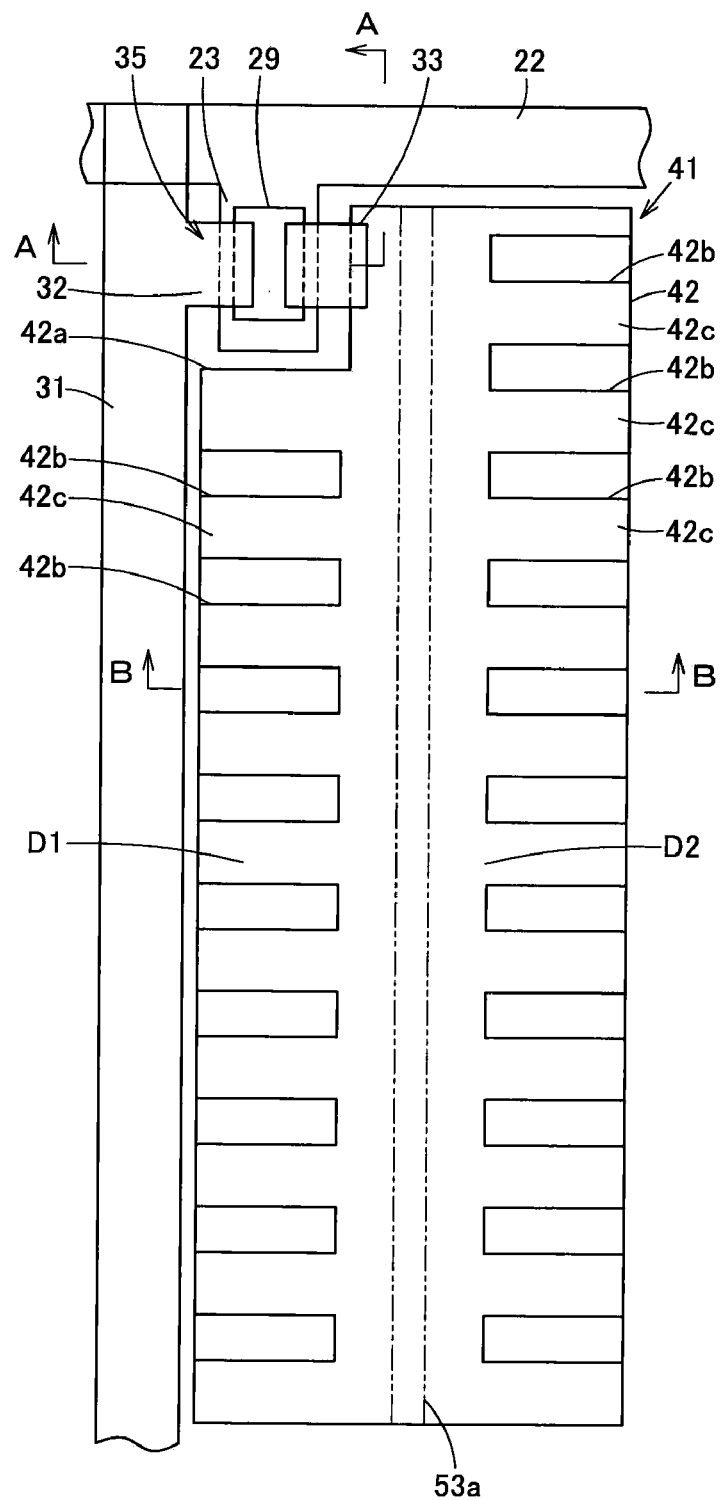
FIG. 2 is a plan view showing the periphery of a pixel of the liquid crystal display element.
Figure 3:
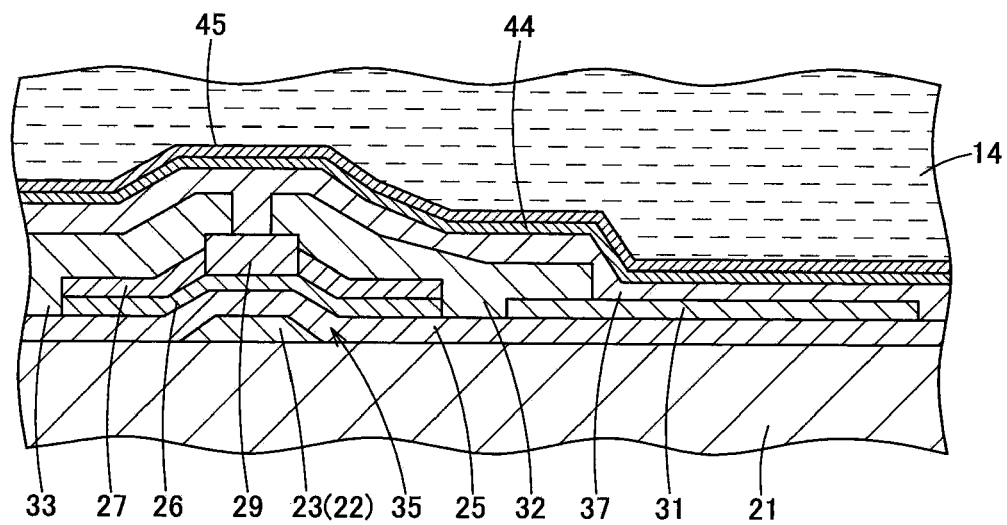
FIG. 3(a) is a cross sectional view taken along line A-A in FIG. 2.
FIG. 3(b) is a cross sectional view taken along line B-B in FIG. 2.
Figure 3:
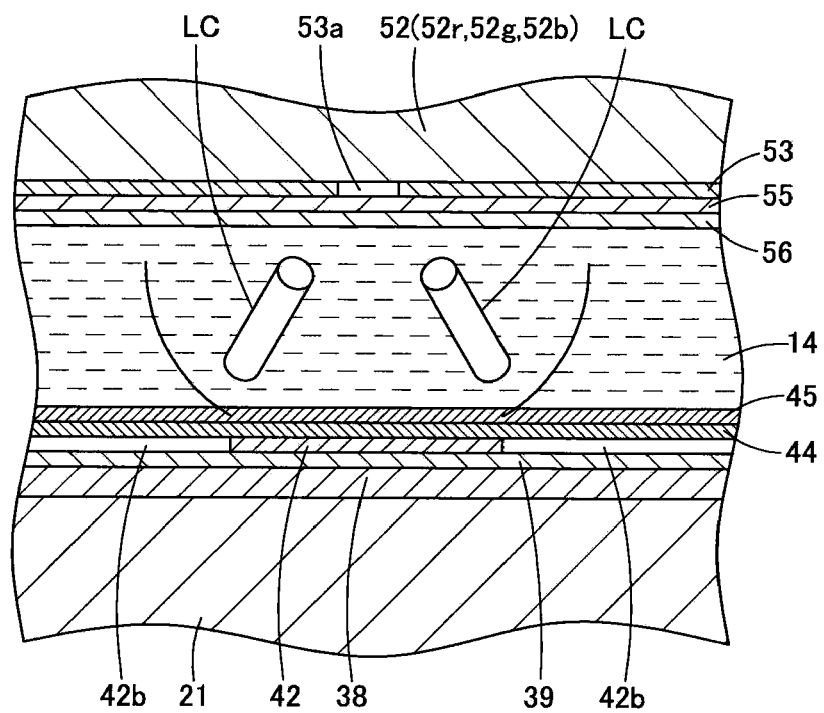
Figure 4:
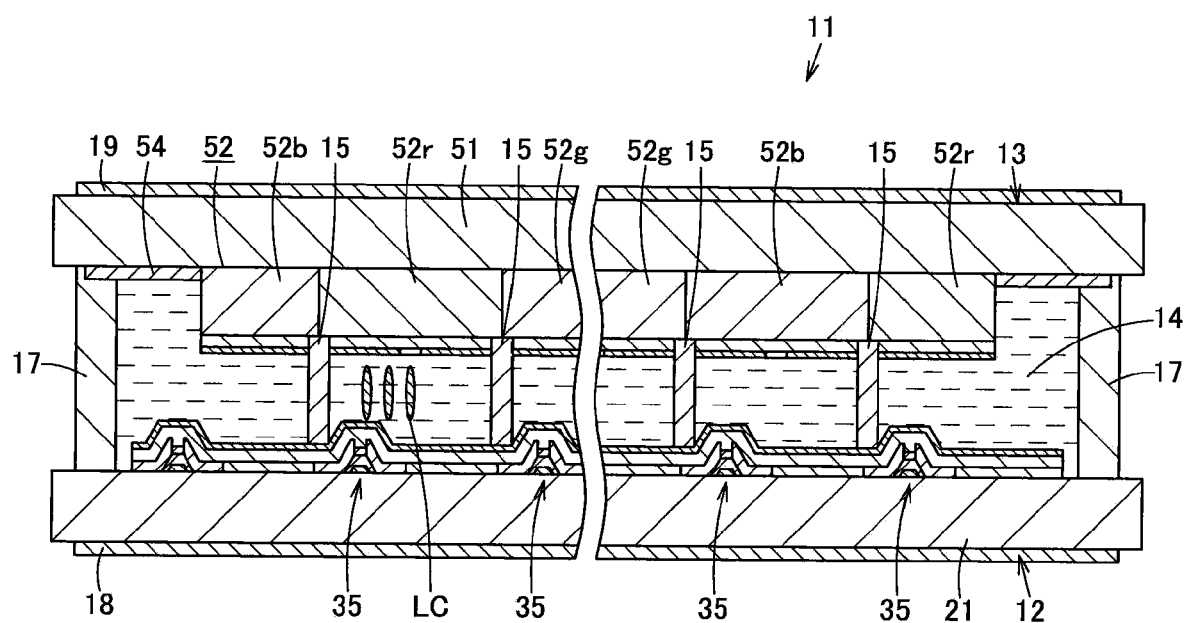
FIG. 4 is a cross sectional view of the liquid crystal display element.
Figure 5:
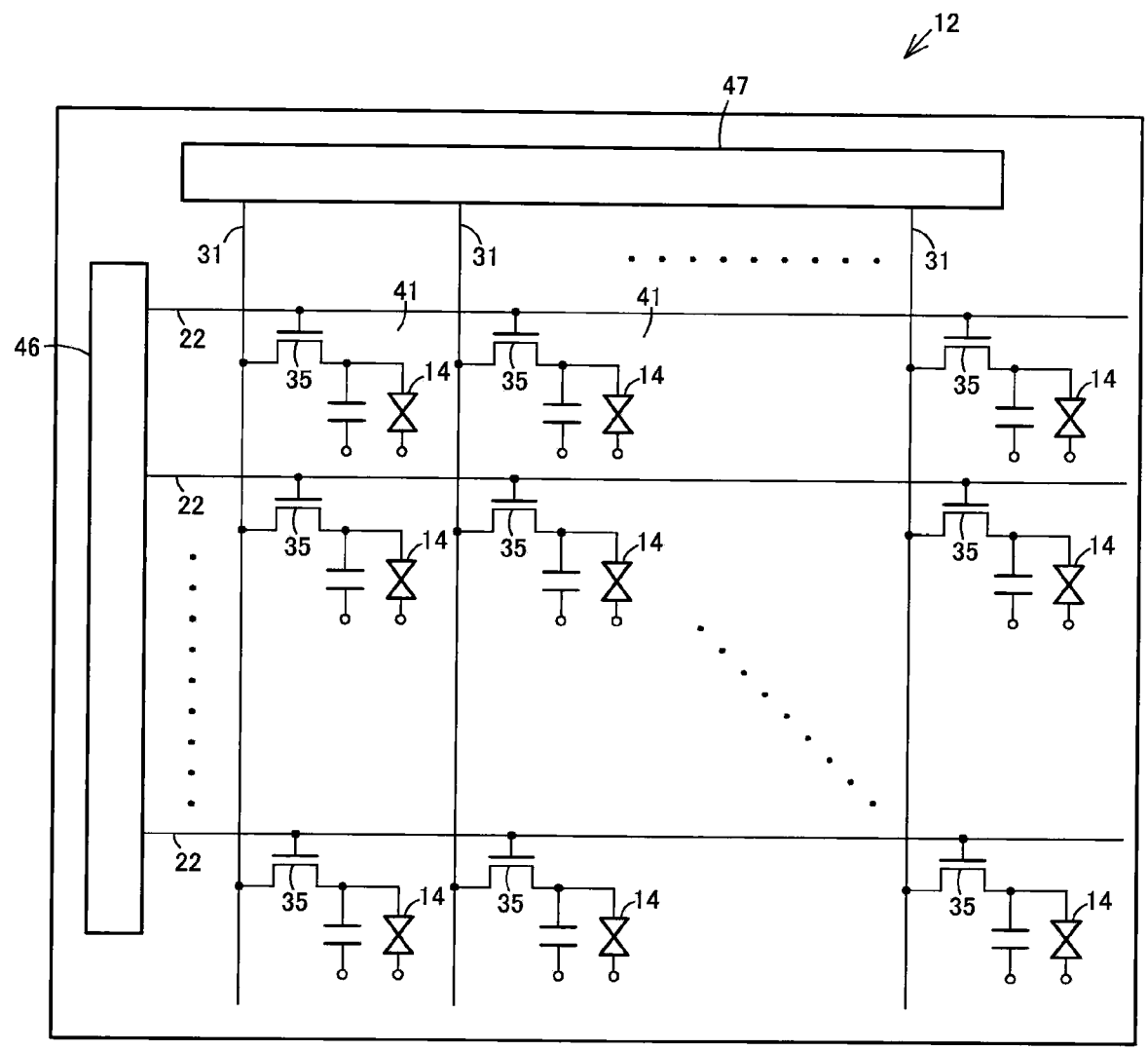
FIG. 5 is a circuit diagram of the liquid crystal display element.

Hereinafter, a liquid crystal display element of a first embodiment of the present invention will be described with reference to the drawings.

In FIGS. 1 to 5, the reference numeral 11 denotes a liquid crystal display element, a liquid crystal cell, the element being, as a substrate unit, a display element of a multi-domain type VAN mode (MVA mode) of transmission type and active matrix type. An array substrate 12 and a counter substrate 13 are arranged so as to face each other in the liquid crystal cell 11, a liquid crystal layer 14 is, as a light modulating layer including a plurality of directors LC which are liquid crystal molecules, interposed between the substrates 12 and 13, and a distance, that is, a gap, between the substrates 12 and 13 is retained by a plurality of spacers 15 each of which is a gap retaining member formed of resin or the like. Further, the array substrate 12 and the counter substrate 13 are bonded with each other by a sealing portion 17 which is a bonding portion arranged so as to surround an outer periphery except for a liquid crystal filling port (not shown) through which the hollow liquid crystal layer 14 is filled with a liquid crystal material. In the liquid crystal cell 11, polarizing plates 18, 19 are bonded with the array substrate 12 and counter substrate 13 respectively. Additionally, a backlight (not shown) as a face light source is arranged on the backside of the liquid crystal cell 11.

In the array substrate 12, on a principal surface of the liquid crystal layer 14 side of a transparent substrate, a glass substrate 21, as an array substrate body having translucency and insulating performance, scan lines 22 formed of, for example, molybdenum (Mo), gate electrodes 23 projecting from the scanning lines 22 and auxiliary capacitance lines (not shown) are pattern-formed, and a gate insulating film 25 such as a silicon oxide film is formed so as to cover the scan lines 22, gate electrodes 23 and auxiliary capacitance lines. Additionally, on the gate insulating film 25, a semiconductor layer 26 such as non-doped amorphous silicon (a-Si) and a low-resistance semiconductor layer (contact layer) 27 such as phosphorous-doped amorphous silicon are laminated in accordance with the position of the gate electrodes 23, and an etching protection layer 29 such as a silicon nitride film is formed. Further, signal lines 31, drain electrodes 32 projecting from the signal lines 31 and island-shaped source electrodes 33 are formed so as to cover a part of the low-resistance semiconductor layer 27 and a part of the etching protection layer 29. Thin film transistors (TFT) 35 as a switching device are formed by the gate electrodes 23, semiconductor layer 26, low-resistance semiconductor layer 27 drain electrodes 32 and source electrodes 33. Additionally, an insulating protection film 37 such as a silicon nitride film is formed so as to cover the signal lines 31, drain electrodes 32 and source electrodes 33, and an organic film 38 as an insulating film and a titanium oxide film 39 as a high dielectric constant insulating layer are formed at a predetermined position on the protection film 37. Pixel electrodes 42 are formed so as to cover the organic film 38 and titanium oxide film 39, the pixel electrodes 42 being formed of a transparent conductive material such as ITO (Indium tin oxide) and being a transparent electrode to constitute a pixel (sub-pixel) 41, and the spacers 15 are arranged at crossing positions of the scan lines 22 and signal lines 31. Further, an orientation film 44 and a polymerizable compound layer 45 are successively formed on the protection layer 37 so as to cover the pixel electrodes and the like.

The scan lines 22 and signal lines 31 are formed in a lattice shape between each pixel 41.

In each thin film transistor 35, the source electrode 33 is connected to the pixel electrode 42, a signal from a gate driver 46, which is a scan line driving circuit, is applied to the gate electrode 23 via the scan line 22 and thus switching control is performed. Additionally, voltage is applied to the pixel electrode 42 in accordance with a signal input from a source driver 47, which is a signal line driving circuit, via the signal line 31, and thus the pixels 41 are independently turned on/off respectively.

Each pixel electrode 42 is formed in the shape of an approximate rectangle, in a plan view, the rectangle having a size of, for example, 40 μm×120 μm, and a cut-off portion 42a is formed by cutting off a portion, at the portion which corresponds to each thin film transistor 35, of the pixel electrode 42 into a quadrilateral. Additionally, a contact hole (not shown) is formed in the vicinity of the cut-off portion 42a of each pixel electrode 42, the contact hole being a recessed pattern for electrically connecting each pixel electrode 42 to the source electrode 33 of each thin film transistor 35. Further, a plurality of electrode slit portions 42b are formed laterally, in a lateral direction in FIG. 2, a width direction of the pixel electrode 42, in the vicinity of both lateral sides of each pixel electrode 42, the electrode slit portions 42b being longitudinal cut-off portions for controlling the falling direction of the director LC of the liquid crystal layer 14.

The electrode slit portions 42b are respectively formed so as to have, for example, a lateral size of approximately 5 μm and a longitudinal size of approximately 20 μm, and are arranged at a pitch of approximately 5 μm. Accordingly, in each pixel electrode 42, a counter projection 42c is formed between the electrode slit portions 42b located in the vicinity of both the sides of electrode 42, the projections 42c being in a comb shape.

The organic film 38 is formed transparently in a visible light region. Additionally, the organic film 38 is set to have a relative dielectric constant higher than, for example, that of the glass substrate 21 of the array substrate 12.

The titanium oxide film 39 has a relative dielectric constant higher than that of the organic film 38 and is formed transparently in the visible light region. The relative dielectric constant of the titanium oxide film 39 is set to be, for example, 10 or more.

The polymerizable compound layer 45 is formed of, for example, acrylic light curing resin, and transparent in the visible light region.

On the counter substrate 13, a color filter layer 52 is formed in, for example, a stripe shape, at positions, which correspond to the thin film transistors 35 on the array substrate 12 side, on a principal surface of a transparent substrate, glass substrate 51, as a counter substrate body having translucency and insulating performance, the color filter layer 52 being a colored layer having coloring portions 52r, 52g and 52b corresponding to red (R), green (G) and blue (B) respectively. Additionally, a counter electrode 53 is formed so as to cover the color filter layer 52, the counter electrode 53 being a common electrode (transparent electrode) formed of a transparent conductive material such as ITO (Indium Tin Oxide), and a frame portion 54, which is a light shielding portion, is formed at the periphery of the color filter layer 52. An orientation film 55 and a polymerizable compound layer 56 are formed so as to cover the counter electrode 53.

In the counter electrode 53, a slit 53a is respectively formed at a position corresponding to each pixel 41. The slit 53a is longitudinally formed along an approximate center of the pixel electrode 42 in its lateral direction, and positioned between the lateral electrode slit portions 42b, 42b of the pixel electrode 42.

The liquid crystal layer 14 is divided into a plurality of, for example, two domains D1, D2 by the electrode slit portions 42b and the slit 53a at the position corresponding to each pixel 41. That is, the domains D1, D2 are formed adjacently to each other in the width direction of each pixel electrode 42.

Here, the falling direction of the counter substrate 13 side of each director LC positioned in the domain D1, D2 in the liquid crystal layer 14 is tilted to the slit 53a when voltage is applied. Additionally, each director LC positioned in each electrode slit portion 42b is approximately parallel with an inner side of the electrode slit portion 42b.

The frame portion 54 is formed of a member having translucency and in a frame shape along an inner edge of the sealing portion 17.

Similar to the polymerizable compound layer 45, the polymerizable compound layer 56 is formed of, for example, acrylic light curing resin, and transparent in the visible light region.

Additionally, the liquid crystal layer 14 is an optical modulating layer formed of a predetermined liquid crystal material, and interposed between the polymerizable compound layer 45 on the array substrate 12 side and the polymerizable compound layer 56 on the counter substrate 13 side. The liquid crystal layer 14 has negative dielectric anisotropy. An orientation direction of the directors LC is controlled so as to be approximately perpendicular to a substrate surface by the orientation films 44, 55.

Additionally, the spacer 15 is formed of, for example, transparent resin having no conductivity, and in a pole shape.

Additionally, the edge of the liquid crystal filling port is partitioned by the sealing portion 17, and the port is sealed with a sealing material (not shown) formed of, for example, UV curing resin.

The polarizing plates 18, 19 are arranged so the transmission axis of one of the plates extends in a horizontal direction in the figure and the transmission axis of the other extends in a vertical direction in the figure. Thus, the polarizing plates 18, 19 become a cross-Nichol polarizing plate in which the transmission axes of the polarizing plates are approximately orthogonal to each other. The transmission axes of the polarizing plates 18, 19 cross an optical axis of the director LC of the liquid crystal layer 14 at approximately 45°.

Next, a manufacturing method of the liquid crystal display element of the first embodiment will be described.

The liquid crystal cell 11 is here manufactured by repeating film formation and patterning, with use of a general process.

That is, a film is first formed on the glass substrate 21 of the array substrate 12 by sputtering a material such as molybdenum at a film thickness of 0.3 μm (first film forming process), and the scan lines 22 (gate electrodes 23) and auxiliary capacitance lines are pattern-formed in a predetermined shape by photolithography (pattern forming process).

Thereon, the gate insulating film 25 composed of, for example, silicon oxide having a film thickness of 0.15 μm, the semiconductor layer 26 and low-resistance semiconductor layer 27 of amorphous silicon or the like, and the etching protection layer 29 composed of silicon nitride or the like are formed (second film forming process).

Then, a film is formed by, for example, sputtering aluminum (Al) at a film thickness of approximate 0.3 μm, simultaneously the signal lines 31 (drain electrodes 32) and the island-shaped source electrodes 33 are formed by photolithography, and thus the thin film transistors 35 are formed (thin film transistor (switching element) forming process).

Further, the insulating protection film 37 composed of silicon nitride or the like is formed on the thin film transistors 35 (protection film forming process), the insulating organic film 38 having, for example, a film thickness of 3.0 μm is formed on the protection film 37, and the titanium oxide film 39 having, for example, a film thickness of 0.2 μm is formed on the upper portion of the insulating organic film 38 (high dielectric constant insulating film forming process).

Then, the pixel electrodes 42 are formed by, for example, sputtering ITO at a film thickness of approximately 0.1 μm (pixel electrode forming process), the electrode slit portions 42b each having, for example, a lateral size of 5 μm and a longitudinal size of 20 μm are formed in the pixel electrode 42 at a pitch of 5 μm (array substrate side slit forming process) by photolithography, and the spacers 15 composed of, for example, a photosensitive resin material having a height size of 4.0 μm are formed at the cross positions of the scan lines 22 and signal lines 31 (spacer forming process).

On the other hand, a photosensitive resist, in which red pigment is scattered, is applied to the glass substrate 51 of the counter substrate 13, and the red coloring portions 52r are formed by photolithography. The green coloring portions 52g and blue coloring portions 52b are similarly formed, and thus the color filter layer 52 having, for example, a film thickness of approximately 1.0 μm is formed (color filter layer (colored layer) forming process).

Then, the counter electrode 53 is formed by, for example, sputtering ITO at a film thickness of approximately 0.1 μm (counter electrode forming process), and the slit 53a having, for example, a width of 10 μm is formed in a direction approximately orthogonal to the electrode slit portions 42b on the array substrate 12 (counter substrate side slit forming process) and the frame portion 54 is formed with a black resin resist (frame portion forming process) by photolithography.

Further, the orientation films 44, 55 are applied to the array substrate 12 and counter substrate 13 at, for example, a thickness of 70 nm respectively (orientation film applying process), and the polymerizable compound layers 45, 56 are formed at a predetermined thickness (polymerizable compound layer forming process).

Then, the array substrate 12 and the counter substrate 13 are bonded with each other at a predetermined position by the sealing portion 17 using an adhesive composed of, for example, epoxy thermosetting resin (bonding process), and then the hollow liquid crystal cell 11 is filled with a liquid crystal material having negative dielectric anisotropy and the liquid crystal cell 11 is formed, the liquid crystal filling port (not shown) is sealed with the UV curing resin (filling port sealing process) The directors LC of the liquid crystal layer 14 are controlled so as to align approximately perpendicularly to substrate faces of the glass substrates 21, 51 by the orientation films 44, 55 and the polymerizable compound layers 45, 56.

Then, the polarizing plates 18, 19 are bonded with the glass substrates 21, 51 of the liquid crystal cell 11 respectively (polarizing plate bonding process), and the liquid cell 11 is completed.

Next, operation of the first embodiment will be described.

When voltage is applied between the pixel electrode 42 and the counter electrode 53, an electric field is tilted to the inside of the electrode slit portion 42b by an electric field discrete effect and thus the director LC is tilted to the outside of the electrode slit portion 42b (in a direction that the far side, from the electrode slit portion 42b, of the director LC moves away from the electrode slit portion 42b).

Here, electric force lines are distributed, as indicated by solid lines L2 each in which a rising portion alternates with a dropping portion, by the titanium oxide film 39 exposed from the electrode slit portions 42b and having a high relative dielectric constant (for example, 20) so as to each run along the edge between each counter projection 42c and electrode slit portion 42b of the pixel electrode 42, relative to an image line L1 indicating a relative dielectric constant of 7. The directors LC fall, as indicated by solid lines running along the electric force lines, so as to be approximately parallel with an inner edge of the electrode slit portion 42b, approximately tilted at 45° relative to the transmission axes of the polarizing plates 18, 19.

According to the first embodiment, as described above, the electrode slit portions 42b are formed in the pixel electrode 42 along the direction crossing the slit 53a for dividing the liquid crystal layer 14 into the domains D1, D2, and the titanium oxide film 39 having a relative dielectric constant higher than that of the organic film 38 formed at the positions corresponding to the electrode slit portions 42b is formed so as to be exposed to the liquid crystal layer 14 via the electrode slit portions 42b. By the titanium oxide film 39, an electric field of each of the domains D1, D2 is set, the angles between the director LC in the vicinity of the electrode slit portion 42b and the transmission axes of the polarizing plates 18, 19 are made to approximately 45°, and a decrease in transmittance caused by the falling direction of the director LC can be suppressed.

That is, as indicated by the expression (1), when the angles between the transmission axes of the polarizing plates 18, 19 and the director LC are 45°, the transmittance becomes maximum. On the other hand, although it is preferable that the width of the electrode slit portion 42b is small for improving the transmittance, there is a possibility that the electric field discrete effect varies and the angles between the transmission axes of the polarizing plates 18, 19 and the director LC deviate from 45° in the case where the width of the electrode slit portion 42b is thus reduced. Therefore, in the first embodiment, in the liquid crystal cell 11 of the MVA mode capable of varying the electric field at the electrode slit portion 42b by arranging the titanium oxide film 39 to the electrode slit portions 42b and of obtaining a high contrast ratio and a wide viewing angle range by making the angles between the transmission axes of the polarizing plates 18, 19 and the director LC approximately 45°, the width of the electrode slit portion 42b is reduced and simultaneously a high transmittance can be obtained.

Additionally, when the relative dielectric constant of the titanium oxide film 39 is 10 or more, the transmittance and contrast ratio can be more securely prevented from lowering.

Further, since the titanium oxide film 39 is adopted as a high dielectric constant insulating layer, productivity, workability and the like can be secured and costs can be reduced.

The polymerizable compound layers 45, 56 are formed between the orientation films 44, 55 and liquid crystal layer 14 respectively, and thus the falling direction of the director LC can be securely controlled, and the high transmittance and high contrast ratio can be obtained.

Figure 6:
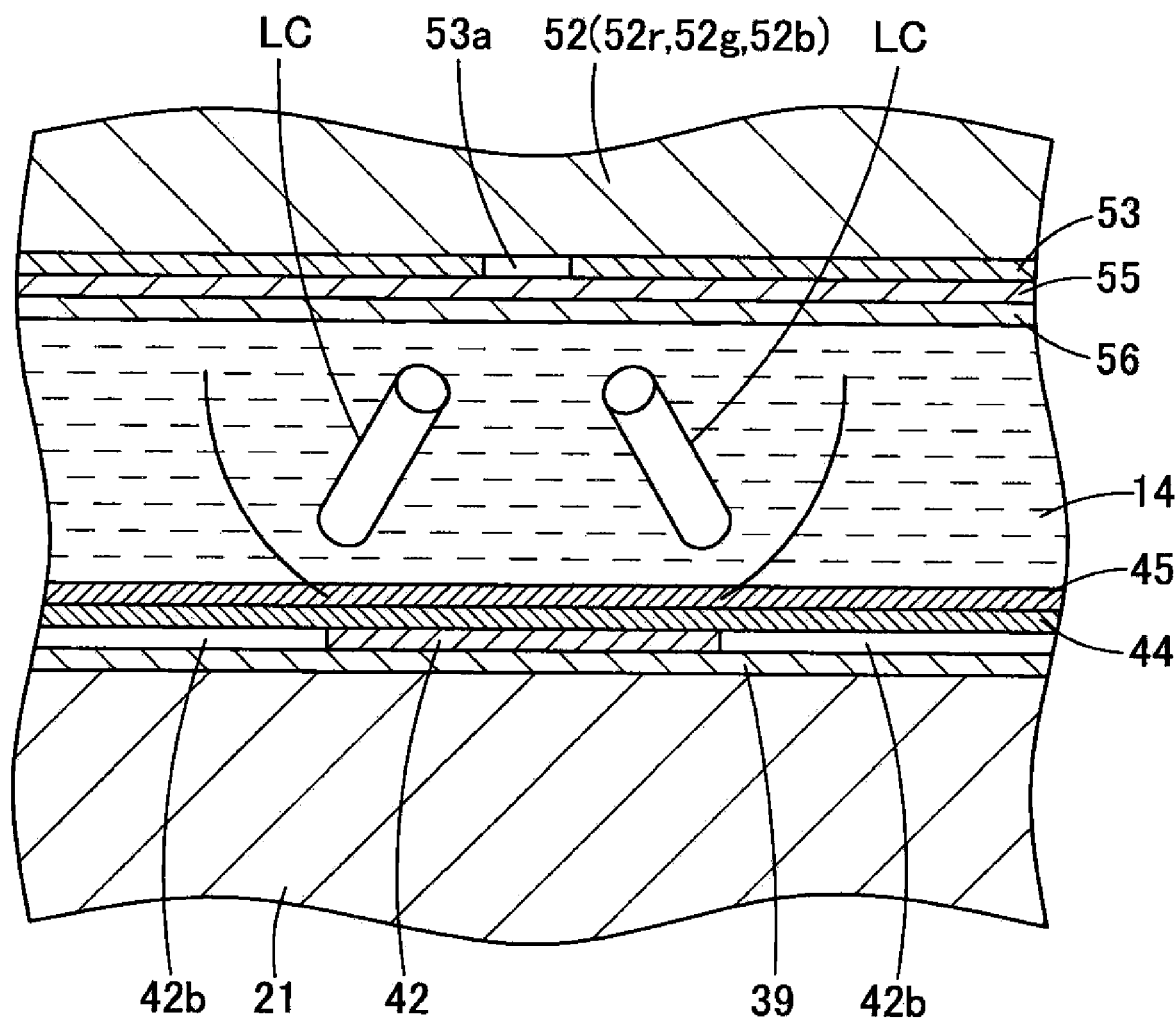
FIG. 6 is an explanatory cross sectional view showing a main portion of a liquid crystal display element of a second embodiment of the present invention.

Moreover, if the relative dielectric constant of the titanium oxide film 39 is set so as to be higher than that of the glass substrate 21 in the first embodiment even in the case where the organic film 38 is not formed as shown in FIG. 6 showing a second embodiment, the distribution of the electric force lines is varied and an operation effect similar to that of the first embodiment can be obtained.

Additionally, slits may be formed at the counter electrode 53 side.

Further, as the high dielectric constant insulating layer, not only the titanium oxide film 39 but also various films such as a film partially containing titanium oxide can be used.

Results of characteristic evaluations are indicated in FIG. 7 regarding Embodiment 1 corresponding to the first embodiment, Embodiment 2 that the first embodiment is partially changed, and Comparison 1 to 3 corresponding to the conventional example.

In a liquid crystal cell of Embodiment 2, both the width of the electrode slit portion 42b and the pitch (width of the counter projection 42c) between the electrode slit portions 42b are set to 10 μm.

A liquid crystal cell of Comparison 1 is produced based on a design and process similar to those of Embodiment 1 except for not forming titanium oxide film 39.

A liquid crystal cell of Comparison 2 is produced based on a design and process similar to those of Embodiment 2 except for not forming titanium oxide film 39.

A liquid crystal cell of Comparison 3 is produced based on a design and process similar to those of Embodiment 1 except for using a high dielectric constant insulating layer having a relative dielectric constant of 7.

As shown in FIG. 7, comparison of Embodiment 1 with Embodiment 2 reveals that it is preferable, in terms of the transmittance and contrast ratio, that the width of the electrode slit portion 42b is small.

Additionally, the transmittances and contrast ratios of Comparison 1 and Comparison 2 are lower than those of Embodiment 1 and Embodiment 2. This reveals that it is effective to expose the titanium oxide film 39 from the electrode slit portions 42b.

Further, the transmittance and contrast ratio of Comparison 3 are lower than those of Embodiment 1. This reveals that it is preferable that the relative dielectric constant of the titanium oxide film 39 used as a high dielectric constant insulating layer is higher than 7.

What is claimed is:
1. A liquid crystal display element comprising:
an array substrate including an array substrate body and a plurality of pixel electrodes formed on a principal surface side of the array substrate body;
a counter substrate which includes a counter substrate body and a counter electrode formed on a principal surface side of the counter substrate body, and is arranged so as to face the array substrate;
a liquid crystal layer including a liquid crystal material having negative dielectric anisotropy and interposed between the array substrate and the counter substrate;
polarizing plates respectively arranged on the array substrate and the counter substrate and having transmission axes approximately orthogonal to each other;
a slit formed in the counter electrode and for dividing the liquid crystal layer into a plurality of domains in which falling directions of liquid crystal molecules are different from each other when voltage is applied between the pixel electrode and the counter electrode;
lacking portions which are provided in at least either the pixel electrode or counter electrode in a direction crossing the slit and control the falling directions of the liquid crystal molecules in each domain; and
a high dielectric constant insulating layer which is exposed to the liquid crystal layer via the lacking portions, is transparent in a visible light region and has a relative dielectric constant higher than that of at least either the array substrate body or counter substrate body.
2. A liquid crystal display element comprising:
an array substrate including an array substrate body and a plurality of pixel electrodes formed on a principal surface side of the array substrate body;
a counter substrate which includes a counter substrate body and a counter electrode formed on a principal surface side of the counter substrate body, and is arranged so as to face the array substrate;

a liquid crystal layer including a liquid crystal material having negative dielectric anisotropy and interposed between the array substrate and the counter substrate;

polarizing plates respectively arranged on the array substrate and the counter substrate and having transmission axes approximately orthogonal to each other;

a slit formed in the counter electrode and for dividing the liquid crystal layer into a plurality of domains in which falling directions of liquid crystal molecules are different from each other when voltage is applied between the pixel electrode and the counter electrode;

lacking portions which are provided in at least either the pixel electrode or counter electrode in a direction crossing the slit and control the falling directions of the liquid crystal molecules in each domain;

an insulating layer which is formed at positions corresponding to the lacking portions at least and transparent in a visible light region; and a high dielectric constant insulating layer which covers the insulating layer at the positions corresponding to at least the lacking portions, is exposed to the liquid crystal layer via the lacking portions, is transparent in the visible light region and has a relative dielectric constant higher than that of the insulating layer.

3. The liquid crystal display element according to claim 2, wherein the insulating layer is an organic film.

4. The liquid crystal display element according to any one of claims 1 to 3, wherein the high dielectric constant insulting layer has a relative dielectric constant of 10 or more.

5. The liquid crystal display element according to claim 4, wherein the high dielectric constant insulting layer contains titanium oxide.

6. The liquid crystal display element according to claim 5, further comprising:

orientation films formed on the liquid crystal layer sides of the array substrate and the counter substrate respectively; and polymerizable compound layers formed between the orientation films and the liquid crystal layer.

7. The liquid crystal display element according to claim 6, wherein the polymerizable compound layer is formed of acrylic light curing resin.

8. The liquid crystal display element according to claim 1 or 2, wherein the lacking portions are formed at both sides of the pixel electrode.

* * * * *